United States Patent [19]

Anderson

[11] 4,122,966
[45] Oct. 31, 1978

[54] SANDWICH PANEL BOX STRUCTURE

[75] Inventor: Michael O. Anderson, Forest City, Iowa

[73] Assignee: Winnebago Industries, Inc., Forest City, Iowa

[21] Appl. No.: 573,319

[22] Filed: Apr. 30, 1975

[51] Int. Cl.² .................. B62D 23/00; B62D 25/00; B62D 27/06

[52] U.S. Cl. .................. 220/1.5; 52/264; 52/781; 296/28 M; 296/31 R; 296/35 A; 296/43; 296/52

[58] Field of Search .................. 220/1.5, 71, 73; 52/615, 264, 501, 498, 483; 49/163, 169, 171; 105/380, 382, 384; 296/35 A, 51, 52, 43, 31 R, 30, 36, 35 R, 43, 28 M; 248/500, 507

[56] References Cited

U.S. PATENT DOCUMENTS

| 784,159 | 3/1905 | Hershey | 296/30 |
|---|---|---|---|
| 1,022,266 | 4/1912 | Saltzman et al. | 296/36 |
| 1,135,826 | 4/1915 | Mc Dermott | 296/36 |
| 1,355,253 | 10/1920 | Ostal | 296/51 |
| 1,632,747 | 6/1927 | Nash et al. | 296/52 |
| 1,829,169 | 10/1931 | Thieman | 296/52 |
| 2,208,618 | 7/1940 | Andersson | 52/498 |
| 2,230,898 | 2/1941 | Mac Fadden | 248/500 |
| 2,258,203 | 10/1941 | Conover | 296/52 |
| 2,382,761 | 8/1945 | Wilks | 52/498 |
| 2,451,880 | 10/1948 | Seckel | 296/43 |
| 2,491,415 | 12/1949 | Metzger | 105/386 |
| 2,623,778 | 12/1952 | Thompson | 296/52 |
| 2,944,492 | 7/1960 | Clejan | 296/35 A |
| 2,994,395 | 8/1961 | Hall | 248/507 |
| 3,363,391 | 1/1968 | Bordenave | 52/61 S |
| 3,511,737 | 5/1970 | Oita et al. | 52/61 S |
| 3,817,569 | 6/1974 | Ehrlich | 296/31 R |

Primary Examiner—William Price
Assistant Examiner—Allan N. Shoap
Attorney, Agent, or Firm—Burd, Braddock & Bartz

[57] ABSTRACT

A fifth wheel trailer coupled to a pickup truck. The trailer has a wheel supported frame carrying a box having a generally horizontal floor and upright side and end walls. The walls are laminated panels having an outer sheet metal skin, an inner sheet metal skin and a core comprising a plurality of side-by-side plywood sheets located between the outer skin and the inner skin. Bonding materials secure the inside surfaces of the outer skin and inner skin to the plywood sheets and the plywood sheets to each other. Stakes secured to the walls are attached to the peripheral edges of the platform with hook bolts.

5 Claims, 7 Drawing Figures

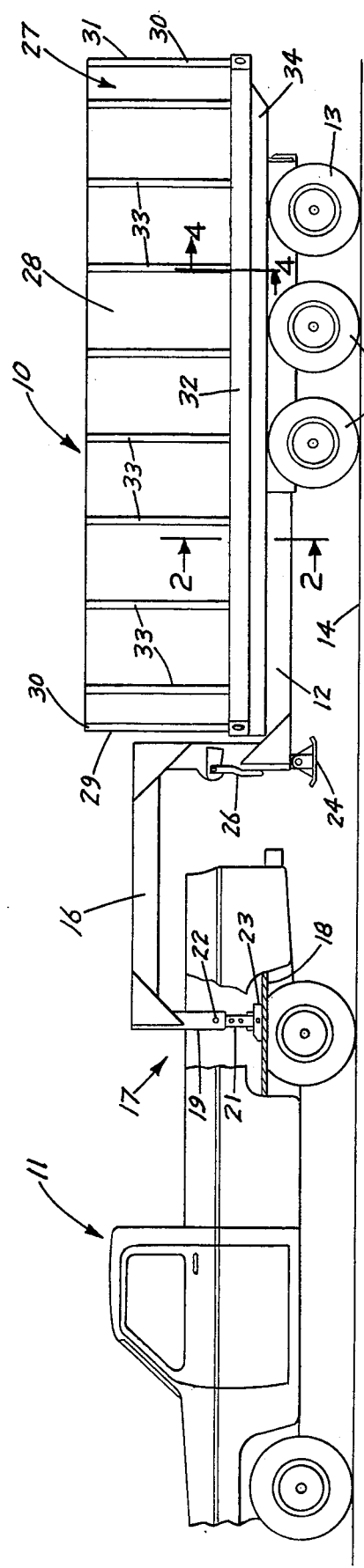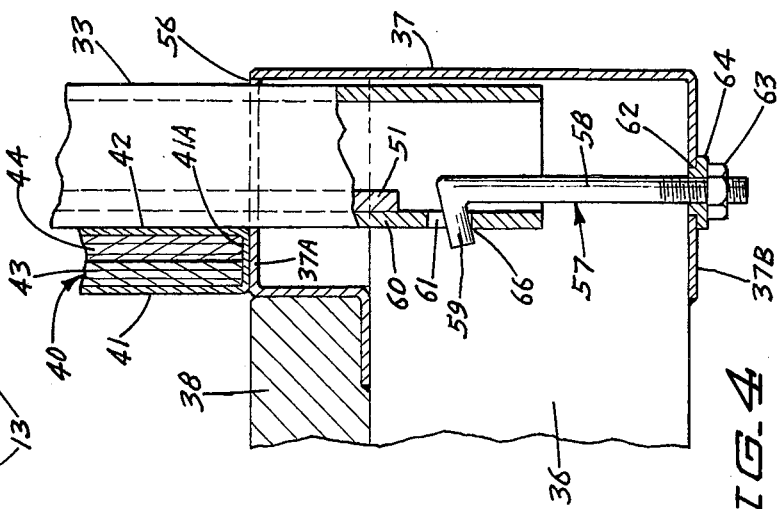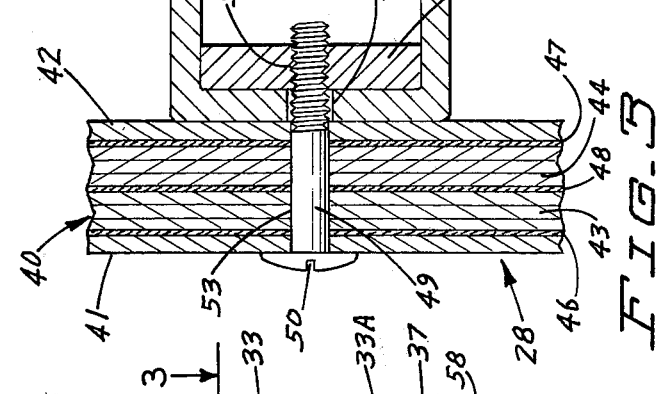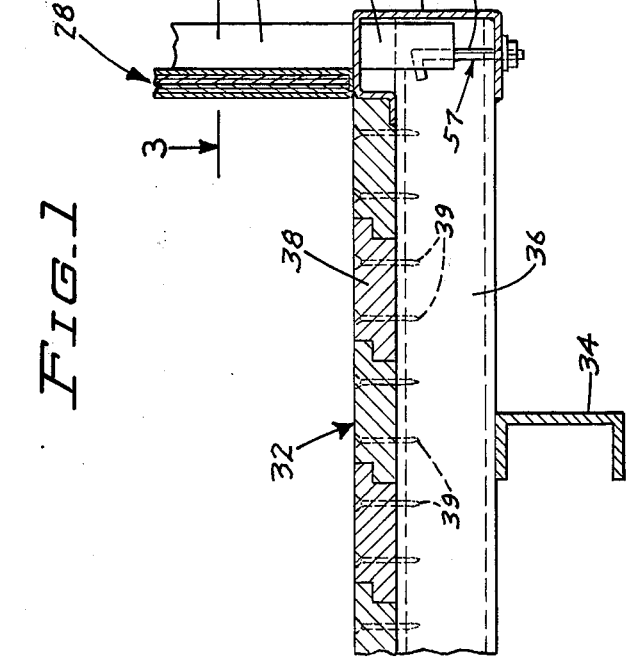

SANDWICH PANEL BOX STRUCTURE

BACKGROUND OF THE INVENTION

Trailers and trucks are equipped with boxes for carrying products and bulk material. The box mounted on the frames of the trailers and trucks have upright side walls and upright front and rear end walls. The end wall may have doors to provide access into the box. The side walls are constructed of material as wood or metal and are anchored to the outside edges of the floor. Boxes made of wood will warp when exposed to moisture and will splinter and break when subjected to impact forces. Metal boxes are relatively heavy, thereby decreasing the load-carrying capacity of the truck. An example of a trailer box is shown in U.S. Pat. No. 3,733,089.

SUMMARY OF INVENTION

The invention is directed to a box assembly and sandwich panels for the side walls and end walls of a box assembly. The box assembly has a platform or floor having a peripheral edge member. Side walls, a front end wall, and a rear end wall extend upwardly from the edge member and are secured thereto with releasable fastening means. The side walls are sandwich panels having outer and inner rigid sheet skins as sheet metal, a core of a plurality of side-by-side rigid sheet members, as plywood, located between the outer skin and the inner skin, and bonding means securing the inside surfaces of the inner and outer skins to the sheet members and the sheet members to each other. The rear end wall has a removable center panel providing an access opening into the box. The center panel has a bottom opening and a gate movably mounted on the center panel to selectively open and close the opening.

An object of the invention is to provide a side and end wall structure for a load-carrying box that does not warp or splinter in use. Another object of the invention is to provide a rugged, versatile and economical box for a vehicle, as a truck or trailer. A further object of the invention is to provide a box for accommodating grain that has a smooth interior surface that facilitates dumping of the grain from the box. Yet another object of the invention is to provide a load-carrying box with side walls and end walls that are releasably coupled to a generally horizontal platform with self-locking fasteners. Another object of the invention is to provide a box with a rear end wall having a removable panel that has an exit opening adapted to be closed with a gate mounted on the center panel. A still further object of the invention is to provide a strong, flat sandwich panel having rigid outer and inner skins bonded to a rigid core of side-by-side sheet members.

IN THE DRAWINGS

FIG. 1 is a side elevational view of a fifth wheel trailer equipped with the box of the invention connected to a pickup truck with a hitch assembly;

FIG. 2 is an enlarged sectional view taken along line 2—2 of FIG. 1;

FIG. 3 is an enlarged sectional view taken along line 3—3 of FIG. 2;

FIG. 4 is an enlarged sectional view taken along line 4—4 of FIG. 1;

DESCRIPTION OF PREFERRED EMBODIMENT

Figure 5:
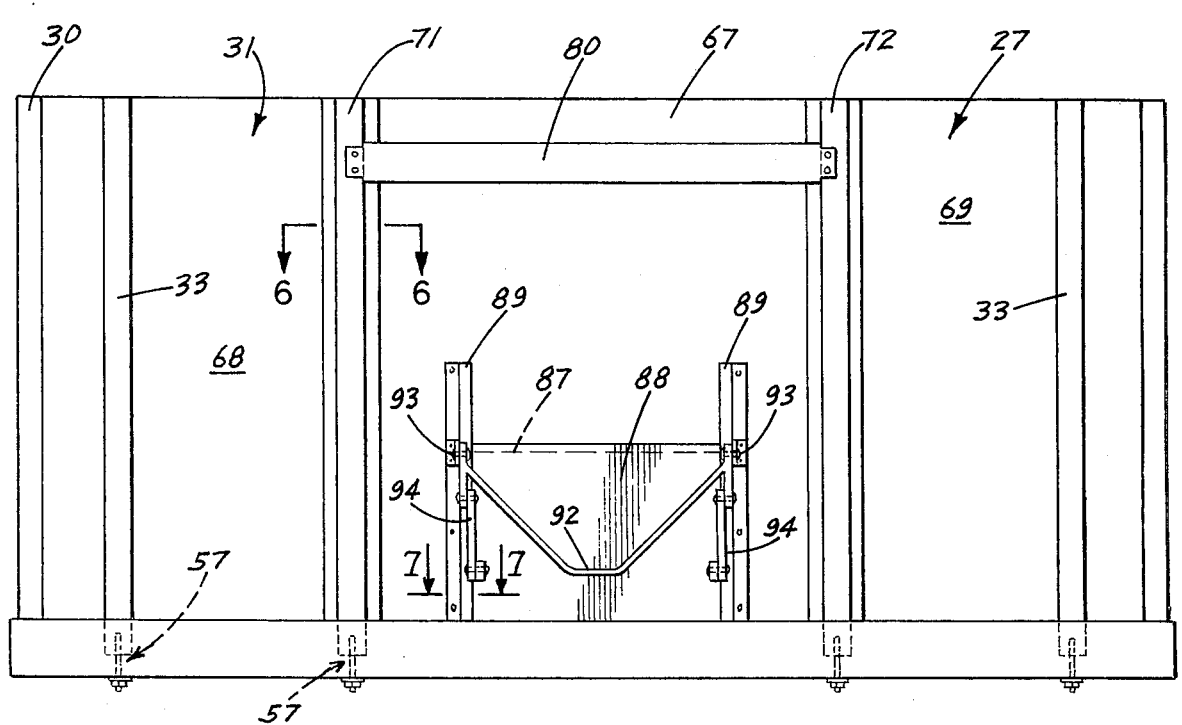
FIG. 5 is an enlarged rear elevational view of the box of the trailer shown in FIG. 1.

Referring to FIG. 1, there is shown a fifth wheel trailer indicated generally at 10 connected to a towing vehicle 11, as a pickup truck. Trailer 10 has a frame 12 mounted on three wheel and axle assemblies 13 supported on a support surface 14. Frame 12 can be supported on two tandem wheel and axle assemblies or one dual wheel and axle assembly. Frame 12 has longitudinal side members secured to a plurality of transverse members (not shown).

A right angle or gooseneck tongue 16 is secured to the forward portion of frame 12. A downwardly directed hitch assembly indicated generally at 17 is attached to the forward end of tongue 16. The hitch assembly 17 is releasably connected to a towing structure, as a king pin, mounted on the truck frame below bed 18. Hitch assembly 17 comprises downwardly directed members 19 and 21 adjustably connected together with a transverse pin 22. A coupling 23 is pivotally mounted on the lower end of member 21. Coupling 23 cooperates with a king pin (not shown) mounted on the truck frame and projected upwardly from bed 18. Hitch assembly 17 can be the hitch assembly shown in U.S. Pat. No. 3,945,668. The hitch assembly of U.S. Pat. No. 3,945,668 is incorporated herein by reference.

A vertically movable stand 24 is mounted on the forward center portion of the frame 12 to support the front end of the frame and the tongue 16. The stand 24 shown in FIG. 1 is in its up or retracted position. A crank arm 26 connected to a lift structure (not shown) is used to extend and retract the stand 24. Hydraulic cylinders and electric drives can be used to control the up and down position of stand 24. When hitch assembly 17 is released from the truck 11, the stand 24 in engagement with surface 14 supports the front of the trailer 10.

A generally rectangular box indicated generally at 27 having an open top is mounted on frame 12. Box 27 can be mounted on a truck frame or a stationary support. Box 27 has upright side walls 28 joined to a transverse upright front wall 29 and a transverse rear wall 31. Walls 28, 29 and 31 are mounted on a platform or floor 32. The walls 28 and 29 are continuous panels that are joined at their adjacent edges with angle members 30 carrying suitable fastening means, as nut and bolt assemblies, rivets and the like.

A plurality of upright stakes 33 are secured to separate portions of the outside of walls 28, 29 and 31. The stakes have downwardly directed projections 33A that extend into holes in side or perimeter member 37. The platform 32 has a plurality of longitudinal beams 34 supporting a plurality of longitudinally spaced transverse beams or stringers 36. The side or edge member 37 is secured by welds or the like to the outer end of beams 36. Side member 37 has a generally inverted G-shape and is secured by means of welds or the like to the top and bottom sides of the beams 36. A flooring 38 is mounted on the transverse beams 36 to cover the space defined by the side or perimeter member 37. Fastening means 39, as self-tapping screws, are used to attach the flooring 38 to the beams 36. Flooring 38 can be tongue and groove planks that are chemically treated to resist rot and weather deterioration.

Referring to FIG. 3, side wall 28 comprises a sandwich panel indicated generally at 40. Panel 40 is a one-piece laminated panel having an inner sheet metal facing 41 and an outer sheet metal facing 42. Sandwiched between facings 41 and 42 are a first plywood sheet 43 and a second plywood sheet 44. Layers of bonding material 46 and 47, as adhesive, glue and the like, bond facing 41 to plywood sheet 43 and facing 42 to plywood sheet 44. Bonding material 48 secures the entire adjacent surfaces of plywood sheet 43 and plywood sheet 44 to each other. Metal facings 41 and 42 enclose the wood sheets 43 and 44 so that the panel 40 does not warp or splinter in use.

A specific example of panel 40 is as follows. Sheet metal facing 42 is a textured aluminum bonded to the plywood sheet 43 with bonding material 46. Sheet metal facing 41 has a smooth exposed surface and is bonded by bonding material 46 to plywood sheet 43. The plywood sheet 43 has a thickness of ⅜ inch and plywood sheet 44 has a thickness of ⅜ inch.

Other types of sheet metal, as steel, stainless steel, and coated sheet metals, can be used for facings 41 and 42. Rigid sheet members made of materials, as hard plastics, ceramics, glass and the like, can be used as outer and inner facings. Other types of rigid construction materials, as construction board, plastic materials, hard board and the like, can be used in lieu of plywood sheets 43 and 44. Also, the thicknesses of sheets 43 and 44 and the number of side-by-side sheets can vary.

As shown in FIGS. 3 and 4, the stake 33 is a generally rectangular tubular member that is located in a generally upright position adjacent the outside of sheet metal facing 42. A plurality of fasteners 49 are used to attach stake 33 to the panel 40. An example of the fastener is shown by bolt 49 which extends through a hole 53 in panel 40. The forward end of the bolt 49 extends through a hole 54 in the stake 33 and is threaded into an elongated captive bar 51 located in the channel of the stake 33. Bar 51 has a threaded hole 52 for accommodating the threaded end of bolt 49. The head end of the bolt can have a non-circular hole or slot in hole 52 of bar 51. Other types of fastening means can be used to attach the stake 33 to the panel 40. For example, the stakes can be riveted to panel 40.

As shown in FIG. 4, the peripheral member 37 has a generally horizontal top wall 37A and a generally horizontal inwardly directed bottom wall 37B. Top wall 37A has a hole 56 allowing the lower end 33A of stake 33 to project into member 37. The top wall 37A has a plurality of holes 56 for accommodating the stakes 33 attached to the walls 28, 29 and 31.

A connector, indicated generally at 57 in FIG. 4, is used to secure stake 33 to member 37. Connector 57 is a hook bolt having an elongated shank or body 58 integral with a laterally projected head or hook 59. Head 59 extends downwardly at an acute angle relative to the longitudinal axis of body 58 and projects through an upright slot 61 in the inside wall 60 of stake 33. The lower end of body 58 is threaded and projects through a hole 62 in bottom wall 37B. A nut 38 is threaded onto the body 58 and engages a washer 64 surrounding the body 58 and located between the nut 63 and the wall 37B. Washer 64 has a circular portion which fits into the hole 62. Nut 63 is turned to clamp the head 59 into engagement with the bottom wall of slot 61. The lower portion of the head 59 is forced into engagement with the sharp outer edge 66 of slot 61 to thereby hold the head 59 in self-locking engagement with the wall 60.

The connector 57 functions to hold the panel 40 in engagement with the top wall 37A. The inner sheet metal facing 41 is turned inward under the plywood sheet members 43 and 44, as shown at 41A. Each stake 33 is attached to the peripheral member 37 with a connector similar to connector 57 shown in FIG. 4.

Referring to FIG. 5, there is shown the rear wall 31 of box 27. Rear wall 31 has a center panel or removable door 67 and stationary or fixed side panels 68 and 69. The center panel is vertically movable to provide a large access opening into the box. The panel 68 is secured to the peripheral platform member 37 with upright posts 33 and 71 and connectors 57 which secure the posts to member 37. Posts 33 and 71 are attached to the panel 68 with fasteners, as bolts, rivets and the like.

Figure 6:
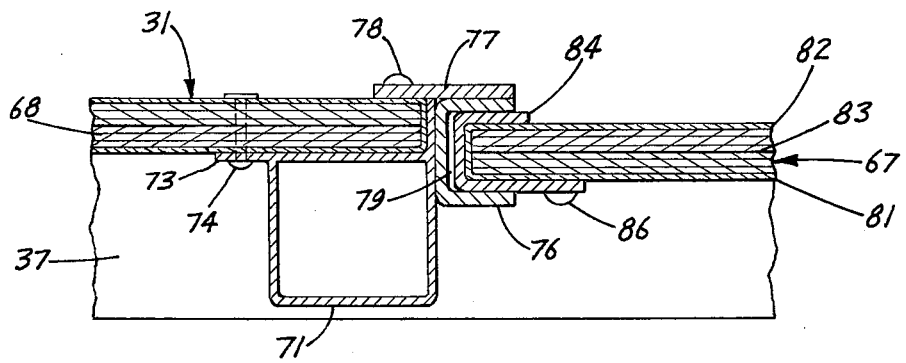
FIG. 6 is an enlarged sectional view taken along line 6—6 of FIG. 5.

As shown in FIG. 6, post 71 has an outwardly directed upright flange 73 connected with a rivet 74 to the panel 68. Additional rivets in flange 73 are used to connect post 71 with panel 31. Secured to the inside of post 71 is an inwardly open upright channel 76. A plate 77 is located along the inside of channel 76 and is attached to the panel 68 with fastener 78. Channel 76 has an inwardly open upright groove 79 providing a guideway for the center panel 67. The post 72 has an identical channel providing a groove for the opposite upright edge of center panel 67. Center panel 67 is vertically movable and can be removed from the box. A cross member 80 connects the upper ends of posts 71 and 72.

Center panel 67 has an outside sheet metal facing 81, an inside sheet metal facing 82 and a core 83 secured to and located between the facings 81 and 82. The core 83 is comprised of side-by-side plywood sheets that are bonded together with suitable bonding material. The outside facings are preferably sheet metal, such as sheet aluminum. Other types of metal sheeting can be used for the facings 81 and 82. The center panel 67 can be of the same construction as the sandwich panel shown in FIG. 3. A generally U-shaped side member 84 is located about the side edges of panel 67. A fastener 86, as a rivet or the like, secures member 84 to the panel 67. Member 84 is located in groove 79 and has a sliding fit relative to the inside walls of the channel member 76. The opposite side of panel 67 has a similar U-shaped member cooperating with the channel member secured to the post 72.

Figure 7:
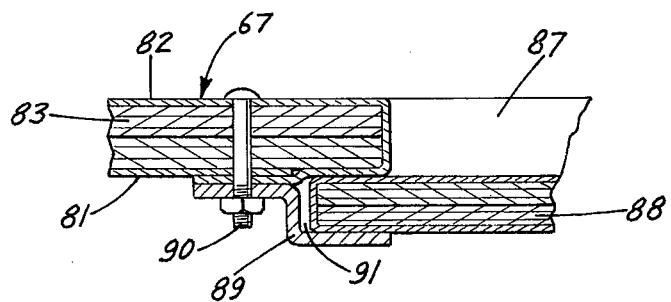
FIG. 7 is an enlarged sectional view taken along line 7—7 of FIG. 5.

The center portion of the lower part of center panel 67 has a rectangular opening 87 that is closed with a gate 88. Gate 88 is a flat panel member having a generally rectangular shape and is made of sandwich-type construction similar to the sandwich panel 67. The gate 88 can be solid metal or wood. The gate is movably located on the panel 67 with a pair of upright guides 89. The guides are stepped members that are secured to panel 67 with fasteners 90, such as nut and bolt assemblies, rivets and the like, as shown in FIG. 7. Guides 89 provide upright channels or grooves 91 for accommodating the side portions of the gate 88 so that the gate can move up and down to selectively open or close the opening 87.

Referring to FIG. 5, a generally U-shaped lever arrangement 92 is pivotally mounted with pivot structures 93 to the guides 89 adjacent the top of gate 88. Downwardly directed links 94 are pivotally connected to gate 88 and lever 92 so that when the lever 92 is moved in an upward direction, gate 88 will move upwardly and thereby open the opening 87. The opening 87 is closed by moving the lever arrangement 92 in a downward direction so that links 94 will move the gate 88 down to its closed position, as shown in FIG. 5.

While there has been shown and described a preferred embodiment of the invention, it is understood that changes in the materials, size and structures can be made by those skilled in the art without departing from the invention. For example, stakes 33 can be solid rigid members made of metal, wood, plastic or other rigid materials. Bolts 49 can be threaded into threaded bores in the rigid members or extend through holes in the rigid members with nuts on the bolts clamping the stakes to the side walls.

The embodiments of the invention in which an exclusive property or privilege is claimed are defined as follows:

1. A box assembly for vehicles carrying bulk material and the like, comprising,
    a peripheral frame including a substantially planar top wall portion and a bottom wall portion spaced therefrom,
    a floor mounted on said frame therewithin,
    a plurality of substantially vertical front, side, and rear end walls seated upon and extending upwardly from said frame top wall portion, thereby to define with said floor a box,
    a plurality of upright stakes,
    first fastening means securing said walls to said stakes,
    said frame top wall portion having holes therein at intervals therealong for receiving the lower ends of said stakes therethrough and with said stake lower ends in spaced relation to said frame bottom wall portion thereby to seat said walls secured thereto on said frame top wall portion, and,
    second fastening means extending between said frame bottom wall portion and each said stake lower end securing said stakes to said frame with said walls urged firmly against said frame top wall portion.

2. The assembly of claim 1 wherein said substantially vertical walls comprise respectively an outer sheet metal skin, an inner sheet metal skin, a core including a plurality of side-by-side plywood sheets, and bonding means securing said sheets together.

3. The assembly of claim 1 wherein said rear end wall has a center panel having a bottom opening, means detachably securing said center panel to said end wall, and a gate movably mounted to said center panel to control said opening.

4. The assembly of claim 1 wherein said stakes are of tubular form having a bore therethrough and said first fastening means includes an elongated bar received in said bore for threaded reception of a plurality of bolts extending from said panels through apertures in said stakes.

5. The assembly of claim 1 wherein said second fastening means includes a bolt having a laterally projecting head extending through a lateral slot in each stake, and a threaded extension on said bolt extending through a slot in said frame bottom wall portion and having a nut threaded thereon.

* * * * *